Dec. 22, 1953     G. B. HOLTZCLAW     2,663,500
HUMIDIFYING SYSTEM AND APPARATUS
Filed July 21, 1951     2 Sheets-Sheet 1

Inventor:
Grover B. Holtzclaw,
by Nathan Heard
Attorney

Dec. 22, 1953         G. B. HOLTZCLAW         2,663,500
HUMIDIFYING SYSTEM AND APPARATUS
Filed July 21, 1951                           2 Sheets-Sheet 2
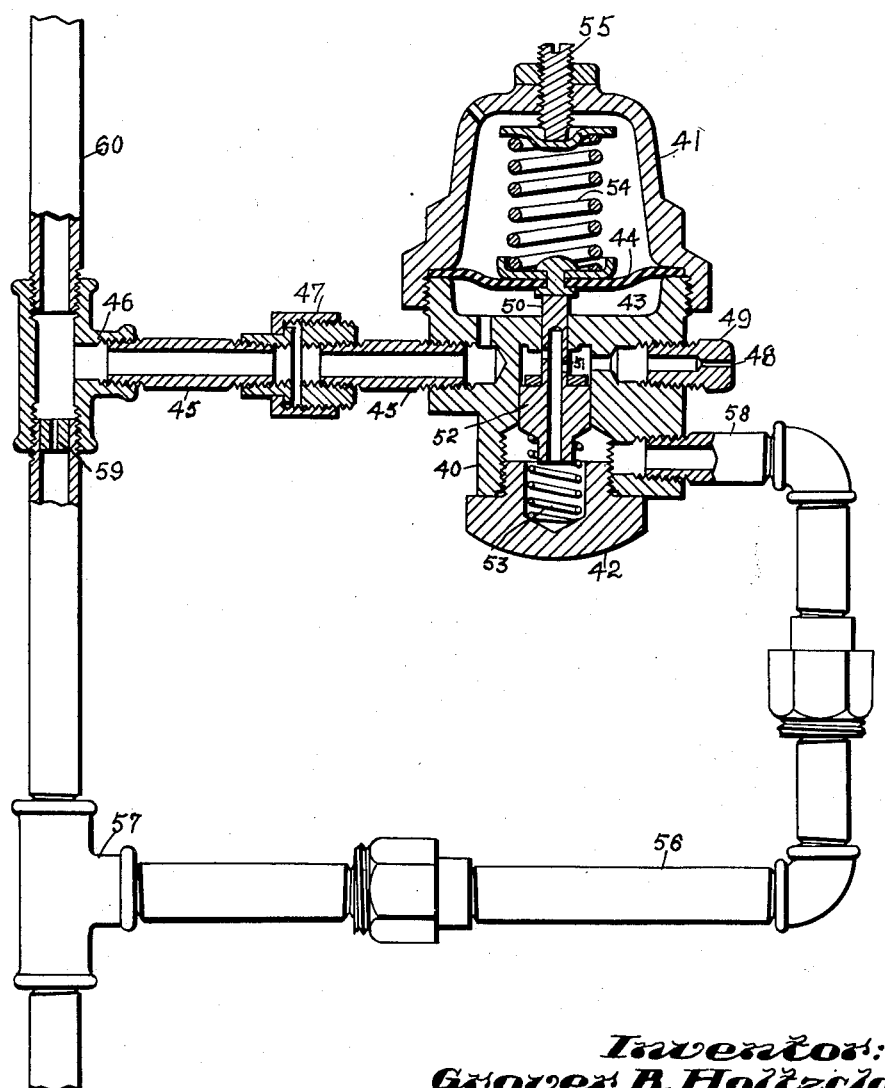
Inventor:
Grover B. Holtzclaw,
by Nathan Heard
Attorney Patented Dec. 22, 1953

2,663,500

UNITED STATES PATENT OFFICE 2,663,500

HUMIDIFYING SYSTEM AND APPARATUS

Grover B. Holtzclaw, Charlotte, N. C., assignor to Parks-Cramer Company, Fitchburg, Mass., a corporation of Massachusetts Application July 21, 1951, Serial No. 237,871

13 Claims. (Cl. 236—44)

This invention relates to a humidifying system for an enclosure having atomizer heads or humidifiers to which are fed both air and water under superatmospheric pressure and the moisture or evaporative output of which is automatically controlled to meet the requirements for humidity in the enclosure, and in which the water pressure is produced by compressed air introduced into a water pressurizer or closed vessel. When in such a system the pressure of the air fed to the atomizer heads and to the pressurizer is controlled by main and supplemental valves by the action of a regulator responsive to the humidity conditions of the enclosure, it operates successfully and satisfactorily throughout a moderately wide range of evaporative output, balancing the requirement for moisture to maintain a predetermined humidity condition with the output of the atomizer heads throughout this range. In such a system the air pressure and the water pressure at the heads vary together throughout a range of operation which is limited by the fact that the water pressure bears a fixed relation to the air pressure and by the fact that the low point of the range is determined either by the minimum air pressure which is possible for satisfactory control or (in some systems) by the minimum air pressure which will satisfactorily atomize the amount of water delivered.

The principal object of the invention is to provide for gradually changing the evaporative output of the atomizer heads so that as the air pressure is gradually reduced to the minimum limit for satisfactory control the evaporative output will simultaneously be reduced gradually to zero or to a fixed limit such as the minimum limit for continuous fine spraying.

While the broad principles of the invention are applicable to any type of humidifying system containing a water pressurizer, whether the water level thereof is located below, above, or at the level of the atomizer heads, and whether the water pressure at the heads is less than, equal to, or greater than the air pressure at the heads, it will be sufficient to describe the invention as applied to that type of humidifying system in which the level of the water in the water pressurizer is below the level of the atomizer heads and in which the water pressure at the heads is maintained below the air pressure at the heads. Such a system is well disclosed in application Serial Number 73,910, filed February 1, 1949, now Patent No. 2,630,972. The atomizer heads may be of any suitable design and character, but are shown as of the type disclosed in Patent No. 2,384,679, granted September 11, 1945. The method and apparatus disclosed in the aforesaid application provides for automatically varying the output of the atomizer heads and applies to a system in which the pressure of the water fed to the heads is at a constant lower degree than the pressure of the air fed to the heads and in which the pressure of the air in a conduit leading to the heads and by a branch to the pressurizer is controlled by main and supplemental valves in the air conduit by a regulator responsive to the humidity conditions of the enclosure in which the heads are located. Such a system, as already pointed out, operates successfully and satisfactorily throughout a moderately wide range of evaporative output. The present invention materially extends throughout a predetermined wider range of the operation the balance of the requirement for humidity and the output of the heads gradually changing the evaporative output of the heads, so that as the air pressure is gradually reduced the evaporative output will simultaneously be gradually reduced to a fixed or predetermined limit and preferably to the minimum limit for continuous spraying.

As outlined in the aforesaid application, the water pressure at the heads is maintained lower than the air pressure at the heads and by using an enclosed water tank, or pressurizer, a constant pressure difference is maintained so that as air pressure is reduced by the regulating apparatus in response to a reduced requirement for moisture, the water pressure is reduced a like amount, and, conversely, when air pressure is increased water pressure is increased by a like amount. This avoids any possibility of the water pressure ever coming closer to the air pressure than a predetermined amount which would result in too much moisture being delivered by the heads with attendant coarse spray and possible wetting down.

Over a wide range of change in the air pressure fed to the heads the water pressure will thus vary with the air pressure, maintaining a constant differential until a point is reached below which the air pressure cannot be reduced and still maintain good control, and below which the pressure is shut off automatically to stop the heads from spraying.

It is quite common to employ in a system of this type a source of compressed air of 30 pounds gage pressure, and experience has shown that air pressure at heads of the type in question should be not less than 10 pounds gage for satisfactory operation. Between these limits of 30 pounds and 10 pounds, air pressure may vary with excellent results, provided water pressure is properly correlated.

With compressed air at 30 pounds connected to the heads and also to the pressurizer for effecting the water pressure at the heads, a portion of the air pressure in the pressurizer is required to raise the water to the level of the heads, all as disclosed in the aforesaid application Serial No. 73,910.

For a typical atomizer of the type referred to and with air pressure at 30 pounds, a water pressure of 28.7 pounds has been found to result in an output of between 15 and 16 pounds of sufficiently fine spray or fog to be entirely satisfactory for most industrial rooms requiring artificial humidification. The difference between these pressures, 1.3 pounds, is the pressure required to raise water 3 feet. Consequently this system is commonly set up with the water level in the pressurizer about 3 feet below the level of the heads.

Now as the air pressure is varied gradually under the control of the regulator in response to the changing demand for humidification, this variation of the air pressure at the heads and in the pressurizer is the same so that the simultaneous water pressure at the heads differs from the air pressure at the heads by the constant amount of 1.3 pounds.

If as a result of a gradual change in the weather the moisture requirement for maintaining the required humidity in the enclosure is gradually reduced, the regulator, in response to the slight and gradual increase in humidity will gradually reduce the air pressure supplied to the heads and to the pressurizer until under a relatively humid weather condition the air pressure may reach the bottom limit of 10 pounds, below which the regulator will cause the heads to be shut off entirely. At 10 pounds air pressure the water pressure will be 1.3 pounds less, or 8.7 pounds, and at these pressures the spray output of each head will be 5.5 pounds, of excellent quality, but still considerably more than may be needed.

The operation may be illustrated by the tabulation in Table 1, assuming the ordinary conditions already noted of a source of compressed air of 30 pounds, water level of 3 feet below the level of the heads, and with the known tested evaporative output in pounds of fog per hour for different air and water pressures. With the system of the aforesaid application and a typical head of the type referred to, the results would be as follows:

Table 1

| Air Pressure at Heads | Water Pressure at Heads | Pounds of Fog per Hour |
|---|---|---|
| 30 | 28.7 | 15.3 |
| 25 | 23.7 | 13.5 |
| 20 | 18.7 | 11.3 |
| 15 | 13.7 | 8.6 |
| 10 | 8.7 | 5.5 |

The foregoing data is illustrative only as it is a well known fact that changes in the size, shape and positioning of the air and water orifices in such heads change their performance characteristics.

The evaporative output of the heads of 5.5 pounds for 10 pounds air pressure at the heads is considerably above the output required to maintain the predetermined degree of humidity in the enclosure during much of the time and consequently the heads would necessarily have to be shut off and turned on intermittently during a larger portion of the time than if this evaporative output could be graduated automatically to a lower level such as one or two pounds of fog per hour per head.

With this preferred form of the invention the desired results are secured without affecting whatever the performance of the heads at the upper pressures, while extending the range of output at the lower pressures by automatically increasing the differential between air and water pressures progressively as air pressure drops below a predetermined point such as 20 pounds down to the desired minimum such as 10 pounds and correspondingly decreasing the differential as the air pressure rises.

With the present invention desirable results are secured as indicated by the following table:

Table 2

(With Differential Pressure Governor)

| Pressure of Air at Heads | Pressure of Water at Heads | Pressure Difference | Amount of Changes in Pressure Difference | Pressure in Pressurizer | Output each Head in Pounds of Fog per Hour |
|---|---|---|---|---|---|
| 30 | 28.7 | 1.3 | 0 | 30 | 15.3 |
| 25 | 23.7 | 1.3 | 0 | 25 | 13.5 |
| 20 | 18.7 | 1.3 | 0 | 20 | 11.3 |
| 15 | 13.3 | 1.7 | 0.4 | 14.6 | 6.4 |
| 10 | 7.9 | 2.1 | 0.8 | 9.2 | 1.5 |

Thus it will be seen that while the air pressure at the heads is being varied between 20 and 10 pounds, the difference between air and water pressures at the heads varies between 1.3 and 2.1 instead of remaining constant at 1.3, and that the amount of this difference changes oppositely to the changes in the air pressure effected by the regulator, that is, the table illustrated, rising from 0 to 0.8, while the air pressure is falling from 20 to 10 and oppositely decreasing from 0.8 to 0 as the air pressure rises from 10 to 20, with the result that the evaporative output varies between 11.3 and 1.5 instead of between 11.3 and 5.5 pounds of fog per hour. Considering the pressure relations in a somewhat different manner and noting the figures in the column headed "Pressure in Pressurizer" it will be seen that, while the air pressure as determined by the regulator is varying in the range between 20 and 10, the pressure in the pressurizer is varying between 20 and 9.2. Thus the pressure in the pressurizer is always varying with the pressure as determined by the regulator, but at a faster rate and consequently the evaporative output of the heads has a greater variation than would occur if the pressure in the pressurizer were effected only by the regulator.

It is obvious that with output reduced gradually to 1.5 pounds before the heads are shut off, as shown in Table 2, instead of to 5.5 pounds, as shown in Table 1, continuous humidification will be provided during a much larger percentage of the time, and the disadvantages of intermittent over-humidification and under-humidification which are characteristic of ordinary humidifying systems of the atomizer type will be almost entirely avoided.

With the system as disclosed in the aforesaid application Serial No. 73,910 these improved results are secured by installing in the compressed air branch conduit to the water pressurizer an air restriction and an automatic differential pressure governor. This device is readily designed to meet the requirements of the particular system and to accord with the range of pressures desired with any desired degree of precision of control and is readily adjustable. Consequently, in its preferred form the present invention is secured by providing for the operating characteristics illustrated in Table 2 in the system of control having the sort of operating characteristics illustrated by Table 1.

Briefly this differential pressure governor consists of an automatic valve which controls the escape of air through a small exhaust port. As air pressure in the air conduit to the heads and in the branch to the pressurizer is gradually reduced (in response to an increase in humidity of the enclosure) the drop in pressure is communicated to a diaphragm within the governor permitting the normally open valve to open gradually and to allow some of the air beyond the restriction to escape, thus slightly relieving the pressure in the pressurizer, and thereby increasing the difference between air and water pressure at the heads, further reducing the output of the heads.

Conversely (in response to a decrease in humidity in the enclosure), as air pressure is gradually increased the valve of the governor is gradually closed so that less air escapes until at some intermediate pressure point between 10 pounds and 30 pounds, the governor becomes inoperative and thereafter the pressure in the pressurizer remains the same as the pressure at the heads with a constant difference between air and water pressure at the heads due only to the difference in level between heads and pressurizer.

The air pressure point at which the governor begins or ceases to be effective as air pressure to the heads drops on rising humidity, or as air pressure to the heads rises on falling humidity, is important only as it affects the practical operation of the governor on a gradual basis. In comparison with Table 1, Table 2 shows the result of the governor being active at air pressures between 20 pounds and 10 pounds. The invention would apply if the governor were designed and adjusted to operate between 15 pounds and 10 pounds or between 25 or 30 pounds and 10 pounds, or between any other two pressures in the same or in a similar performance cycle.

With this explanation the nature and objects of the invention will appear more fully from the following description and the drawing.

In the drawings:

Fig. 3 is a view of a second form of governor also chiefly in vertical cross section and similarly connected to the air conduit.

Figure 1:
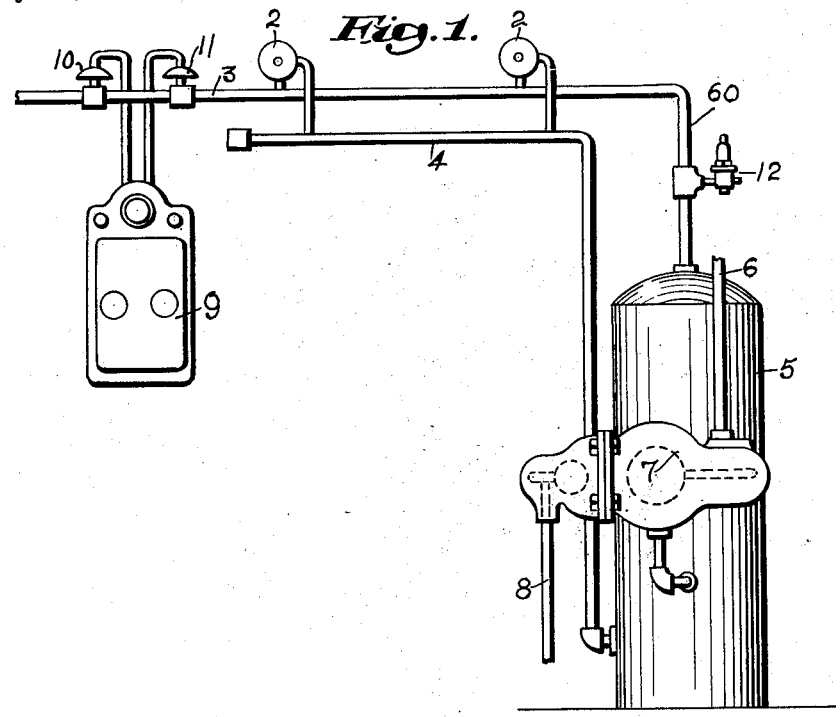
Fig. 1 is an elevation of an apparatus for maintaining a predetermined degree of humidity in an enclosure such as disclosed in the aforesaid application Serial No. 73,910, with an automatic differential pressure governor embodied therein and illustrating the preferred form of the present invention.

Referring to Fig. 1, the atomizer heads 2 are shown attached to a conduit 3 leading from a suitable source of compressed air and also attached to a conduit 4 leading to the water pressurizer 5 below the level of the water therein. A branch 60 of the compressed air conduit 3 also leads to the water pressurizer above the level of the water therein.

Water is supplied through a conduit 6 from a suitable source to the pressurizer 5 and the water level therein is maintained by a ball float valve 7, together with a suitable valve controlled waste conduit 8.

The regulator 9 is indicated, and may be the same as that disclosed in the aforesaid application. This regulator is responsive to the humidity conditions prevailing in the enclosure and controls the main "on" and "off" valve 10 and the gradually acting supplemental valve 11 in the compressed air conduit 3.

The automatic differential pressure governor is indicated at 12 in the compressed air branch 60 of the conduit 3 leading to the pressurizer.

Figure 2:
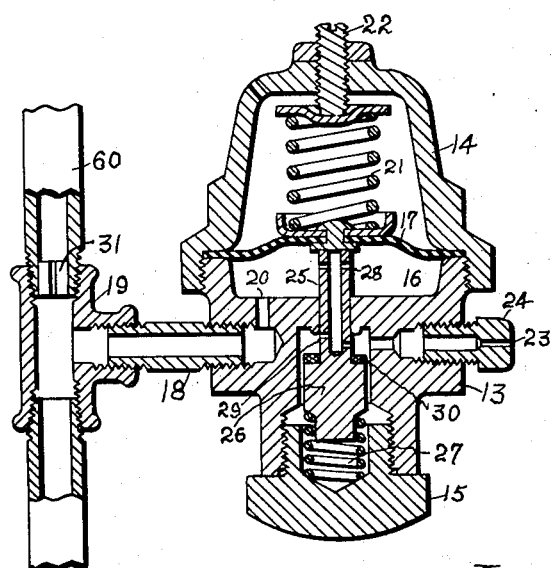
Fig. 2 is a view chiefly in vertical cross section of one form of the governor connected to a branch compressed air conduit leading to the water pressurizer.

This governor, in the form illustrated in Fig. 2, comprises a casing shown as having a body section 13, a cap section 14 threaded to the body section, and a bottom section 15 also threaded to the body section. In the casing is formed a chamber 16 having a flexible diaphragm wall 17 shown as clamped at its perimeter between the cap section 14 and body section 13. This chamber 16 has connection with the branch 60 provided by a pipe section 18 threaded into a T 19 inserted in the branch 60 and also into one side of the body section 13 and through the opening 20. The air pressure thus admitted to the chamber 16 is opposed by the spring 21 seated on the diaphragm and abutting an adjustable screw 22 in the top of the cap section.

An exhaust port 23 is provided in a plug 24 threaded into the side of the body section and a passageway leads from the branch 60 through the casing to this exhaust port with a valve located in this passageway and controlled by the position of the diaphragm. The valve is shown as a tubular member 25 terminating at the bottom in a head 26 and is pressed against the diaphragm by a spring 27 seated in the bottom section 15. The tube near the top and bottom is provided with small apertures 28 and 29 respectively. The passageway from the branch 60 leads through the pipe 18 through the opening 20, thence through the tube 25 to the outlet port.

It will be seen that as the pressure transmitted to the chamber 16 increases and raises the diaphragm wall 17 the valve moves up until the lower apertures 29 pass within the bottom wall of the chamber and gradually close the passageway leading to the outlet, while as the pressure falls the reverse operation takes place. In fully closed position the gasket 30 seats against the bottom wall of the chamber 16.

In addition a restriction, shown for example by the plug 31, is inserted in the compressed air branch line, the purpose of which is to cause the air pressure in the water pressurizer to be controlled by this governor. In this construction this restriction is located in the branch line before it extends to the connection with the governor and since the valve-controlled passageway to this exhaust port leads from the chamber to which this connection communicates, any opening or closing of the valve as air pressure in the branch line decreases or increases causes more or less reduction in air pressure in the line to the pressurizer.

Since the pressure of the spring 21 in opposition to the air pressure on the diaphragm is adjustable by means of the screw 22, the movement of the valve is thereby adjustable so that the pressure point at which the valve starts to open, or the extent of the opening at any specified pressure point, may easily be suited to the requirement for the best operation of this pressure governor. In the preferred operation of the system, the spring is adjusted so that when air pressure in conduit 3 and in the branch line is 10 pounds, the valve will be open just enough to reduce water pressure so that the output of the humidifiers will be as low as possible for continuous spraying. The proper setting is easily determined by turning the screw in until the humidifiers stop spraying entirely, then backing off the screw slightly until spraying just starts again and continues steadily at a minimum rate.

If after adjusting the governor as above outlined it is found that the upper pressure point when the valve is just closed is too near the 10 pound point to result in a satisfactory automatic balancing of spray output under ordinary operating conditions, or if the upper pressure point is higher than is considered necessary for satisfactory and economical operation of the system, operation of the valve may be varied to give a different performance pattern by changing the design of one or both springs, or the shape and location of apertures 29, or the size of exhaust port 23.

The second form of governor shown in Fig. 3 is similar in principle to that already described, the main difference being that the air pressure operating the valve is taken from the air branch line before it has been restricted, thus increasing the responsiveness of the governor valve to changes in the air pressure.

In this construction the casing again provides a body section 40 having a cap section 41 threaded thereon at the top and a bottom section 42 threaded therein at the bottom. The chamber 43 has the diaphragm wall 44 clamped at its perimeter between the body section 40 and the cap section 41. The connection between the chamber 43 in the body section and the branch 60 is made by two pipe sections 45, one threaded into the T 46 in the conduit branch, the other into the casing body, and the two united by the union 47. The outlet port 48 is in the plug 49 which is threaded into the casing body as before. The tubular valve 50 having the apertures 51 with its head 52 slides in the body section and is pressed upward by the spring 53 against the flexible diaphragm which is opposed by the spring 54 with its adjusting screw 55. A second connection from the casing to the air branch conduit is made by a suitable line of piping 56 extending from the T 57 in the air branch conduit 60 below the T 46 and a section 58 screwed into a boss in the side of the bottom section 40.

In this form the upper tubular portion of the valve 50 is a loose fit in the body section and the head 52 is a sliding fit, whereas the opposite is the case in the construction shown in Fig. 2. Also in this second form the valve member is entirely closed at the top and is open at the bottom. The air passageway controlled by the valve thus has no direct connection with the chamber 43, but instead extends through the piping 56 of the second connection to the air conduit branch through the valve and the openings 51 to the exhaust port 48.

The provisions for adjusting the governor in this second form and the other features are the same as in the first form illustrated in Fig. 2.

In this second form the restriction, again shown as a plug 59, is located in the air branch between the points at which the connection to the chamber extends and the point to which the passageway from the exhaust port extends. Thus the pressure in the air conduit which is controlled by the regulator is transmitted directly to the chamber 50 and the air pressure in the water pressurizer is controlled in part by the valve.

Having thus described the invention, what is claimed as new, and desired to be secured by Letters Patent, is:

1. In a humidifying system for an enclosure having atomizer heads, a water pressurizer, means connecting the pressurizer below the water level to the heads, means connecting compressed air to the heads, means connecting compressed air to the pressurizer above the water level, and a regulator responsive to the humidity conditions of the enclosure acting simultaneously to vary the pressure of the compressed air supplied to the heads and the pressure of the compressed air supplied to the pressurizer, the provision of supplemental means acting, during a predetermined range in the pressure determined by the regulator, to cause the pressure in the pressurizer to vary with and at a faster rate than the rate of variation of the pressure determined by the regulator, thus within said predetermined range to cause a greater variation in the evaporative output of the heads than that effected by the regulator alone.

2. A humidifying system as defined in claim 1, in which said means comprises an automatic differential pressure governor inserted in the means connecting the compressed air to the pressurizer, having an air exhaust outlet, a valve controlling said outlet, means controlled by the variation of the air pressure for operating the valve, and a restriction in the compressed air connecting means acting to cause the air pressure in the pressurizer to be controlled by the valve.

3. In a humidifying system for an enclosure having atomizer heads, a water pressurizer, means connecting the pressurizer below the water level to the heads, means connecting compressed air to the heads and to the pressurizer above the water level, a regulator responsive to the humidity conditions of the enclosure acting simultaneously to vary the pressure of the compressed air at the heads and in the pressurizer and to shut off the compressed air when the pressure at the heads has been reduced below a predetermined point, the provision of a governor inserted in the means connecting compressed air to the pressurizer and comprising a casing, a chamber in the casing having a diaphragm wall, a connection from the said chamber to the compressed air connecting means, an air passageway between said compressed air connecting means and an exhaust port, a valve in the passageway controlled by the position of the diaphragm, a spring opposing air pressure on the diaphragm and causing gradual movement of said diaphragm and gradual opening and closing of said valve as the air pressure on the diaphragm varies below and above predetermined points, and a restriction in the compressed air connecting means to the pressurizer limiting the flow of air to said passageway thus enabling pressure beyond the restriction to be lower than that before the restriction when the valve is open.

4. A humidifying system as defined in claim 3, in which the said passageway extends through the said chamber and through the connection from the chamber to the compressed air connecting means and in which the said restriction is located in the compressed air connecting means before it extends to the said connection to the chamber.

5. A humidifying system as defined in claim 3, with the addition of a second connection from the compressed air connecting means to the casing and in which the said air passageway extends through this second connection, and in which the restriction is located between the points at which the two connections join the compressed air connecting means.

6. In a humidifying system for an enclosure having atomizer heads to which both air and water are fed under superatmospheric pressure, the evaporative output of which is controlled by varying the pressure of the air supplied to the heads by an automatic humidity regulator through a gradually acting air pressure controlling valve, the water pressure being produced by means introducing compressed air to the top of a pressurizer in which the water is maintained at a constant level and from the bottom of which the water is fed to the heads under the pressure produced by the air, the provision of an automatic differential pressure governor connected to the means introducing compressed air to the pressurizer, containing an exhaust port, a valve for controlling the air on its way to said port, means for gradually operating the valve as the air pressure entering the governor varies between predetermined points, and a restriction in the compressed air introducing means acting to cause the air pressure in the pressurizer to be reduced when the air is being exhausted through the exhaust port.

7. In a humidifying system for an enclosure having atomizer heads, a water pressurizer with the level of the water therein maintained a constant distance below the heads, a conduit connecting a source of compressed air to the heads with a branch to the pressurizer above the water level, means connecting the pressurizer below the water level to the heads, a regulator responsive to the humidity conditions of the enclosure acting to vary the pressure of the compressed air in said conduit and to shut off said conduit when the said pressure has been reduced below a predetermined point, the provision of means, acting during a predetermined range of said pressure extending from said point, to maintain the pressure in the pressurizer less than the pressure of the air as controlled by the regulator by an amount changing oppositely to the changes in the air pressure effected by the regulator.

8. A humidifying system as defined in claim 7, in which the said means comprises an automatic differential pressure governor inserted in the compressed air branch leading to the pressurizer, having an air exhaust outlet, a valve controlling said outlet, means controlled by the variation of the air pressure for operating the valve, and a restriction in the compressed air branch acting to cause the air pressure in the pressurizer to be controlled by the valve.

9. In a humidifying system for an enclosure having atomizer heads, a water pressurizer with the level of the water therein maintained a constant distance below the heads, a conduit connecting a source of compressed air to the heads with a branch to the pressurizer above the water level, means connecting the pressurizer below the water level to the heads, a regulator responsive to the humidity conditions of the enclosure acting to vary the pressure of the compressed air in said conduit and to shut off said conduit when the said pressure has been reduced below a predetermined point, the provision of a governor inserted in the air branch leading to the pressurizer and comprising a casing, a chamber in the casing having a diaphragm wall, a connection from the air branch to the said chamber, an air passageway through the casing between the air branch and an exhaust port, a valve in the passageway controlled by the position of the diaphragm, a spring opposing air pressure on the diaphragm and causing gradual movement of said diaphragm and gradual opening and closing of said valve as air pressure on the diaphragm decreases and increases, and a restriction in the air branch limiting the flow of air to said passageway thus causing air pressure in the branch to the pressurizer beyond the restriction to be lower than the pressure before the restriction when the valve is open.

10. A humidifying system as defined in claim 9, in which the said passageway leads through said chamber and said connection and the restriction is located in the air branch before it extends to the said connection.

11. A humidifying system as defined in claim 9, with the addition of a second connection from the air branch to the casing and in which the said passageway extends to the air branch through the second connection, and in which the restriction in the air branch is located therein between the points at which the two connections join said branch.

12. In a humidifying system for an enclosure having atomizer heads to which both air and water are fed under superatmospheric pressure, the evaporative output of which is controlled by varying the pressure of the air supplied to the heads by an automatic humidity regulator through a gradually acting air pressure reducing valve, the water pressure being less than the air pressure and produced by the air which supplies the heads fed to the top of a pressurizer in which the water is maintained at a constant level below the heads and from the bottom of which the water is fed to the heads under the pressure produced by the air, the provision of an automatic differential pressure governor, controlling the compressed air between the heads and the pressurizer, and containing an exhaust port, a valve for controlling the air on its way to said port, means for gradually operating the valve as the air pressure entering the governor varies between predetermined intermediate and minimum points, and a restriction for the passage of the air acting to cause the air pressure beyond the restriction to be reduced when the air is being exhausted through the exhaust port.

13. In a humidifying system for an enclosure having atomizer heads, a water pressurizer with the level of the water therein maintained a constant distance below the heads, a conduit connecting a source of compressed air to the heads with a branch to the pressurizer above the water level, means connecting the pressurizer below the water level to the heads, a regulator responsive to the humidity conditions of the enclosure acting to vary the pressure of the compressed air in said conduit, the provision of means, acting during a predetermined range of said pressure to maintain the pressure in the pressurizer less than the pressure of the air as controlled by the regulator by an amount changing oppositely to the changes in the air pressure effected by the regulator.

GROVER B. HOLTZCLAW.

References Cited in the file of this patent

UNITED STATES PATENTS

| Number | Name | Date |
| --- | --- | --- |
| 1,819,987 | Hodge | Aug. 18, 1931 |